Jan. 14, 1941.   A. L. JOHNSON   2,228,570
HAND LEVER
Filed June 19, 1939
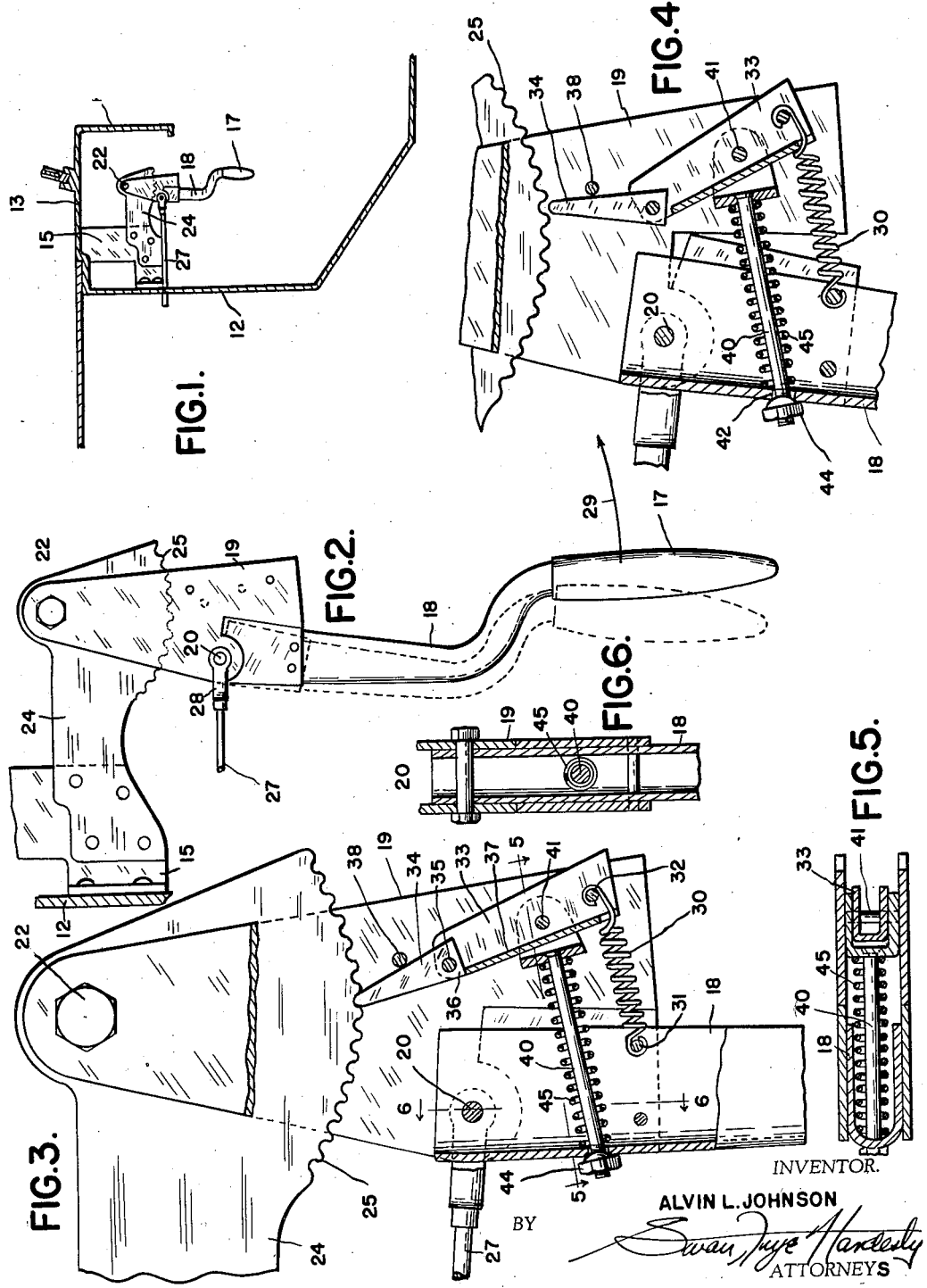
INVENTOR.
ALVIN L. JOHNSON
BY
ATTORNEYS Patented Jan. 14, 1941

2,228,570

UNITED STATES PATENT OFFICE 2,228,570

HAND LEVER

Alvin L. Johnson, Ottawa Hills, Ohio, assignor to American Forging and Socket Company, Pontiac, Mich., a corporation of Michigan Application June 19, 1939, Serial No. 279,860

3 Claims. (Cl. 74—536)

This invention relates to pawl and ratchet type lever mechanisms, and particularly to hand levers such as are used to control the emergency brakes of motor vehicles, although the invention is not restricted to such use.

An important object of the invention is to provide, in combination with a novel articulated lever assembly, an improved automatic pawl and ratchet mechanism, of very simple and inexpensive construction, which, when the lever assembly is moved in one direction, securely locks it against unwanted return movement, yet which is so arranged as to release automatically, and allow return movement of the lever assembly when the hand grip portion of the lever is positively urged in the return direction, no special manipulation of a separate release mechanism being required to effect such release, despite which, no load exerted upon the lever by the controlled apparatus can cause such return movement.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a fragmentary and somewhat diagrammatic vertical sectional view through the cowl and adjacent portions of a motor vehicle, showing in side elevation a brake operating lever mechanism constructed in accordance with the present invention.

Figure 2 is a side elevational view of the lever mechanism, on a large scale.

Figure 3 is a vertical sectional view of the pawl and ratchet mechanism and adjacent parts of the lever assembly, on another and still larger scale, the parts being shown in locked position.

Figure 4 is a fragmentary view, similar to Figure 3, showing the pawl and ratchet mechanism released; and Figures 5 and 6 are sectional details taken substantially on lines 5—5, and 6—6, respectively, of Figure 3, and looking in the direction of the arrows.

Referring now to the drawing:

It will be seen that a portion of the body of a motor vehicle is illustrated, in Figure 1, as typifying a use to which my improved lever is adapted to be put, and a suitable manner in which the same may be supported. A bracket 15 is provided, bolted or otherwise secured, behind the instrument panel 11, to the dash 12 and cowl 13, the arrangement being such that the hand grip portion 17 projects beneath the instrument panel in a position conveniently accessible to the operator of the vehicle.

The lever consists of two articulated sections 18, 19, limitedly rockable with relation to each other and joined by a pin 20. The entire lever assembly is pivoted, by means of a bolt 22, to a ratchet plate 24. The ratchet plate, being attached to the bracket 15, serves to support the assembly, and a series of ratchet teeth, 25, of rounded contour, are formed along its lower edge, and arced concentrically about the axis of pivot 22. A draft rod 27 may serve to connect the lever assembly to the apparatus to be controlled (unshown), and is articulated to the pin 20 by means of a clevis 28. The upper lever section 19 comprises a holding section, and the lower section 18 serves as an operating or hand portion. The two sections will be seen to abut one another in such manner that when the hand grip portion 17 is pulled in the direction indicated by the arrow 29 (Figure 2), the sections move as a unit. No lost motion occurs when the lever assembly is moved in this direction, for the reason that the sections are normally maintained in engagement by a tension spring 30, which draws them together. One end of the spring is hooked to a pin 31 carried by the hand lever section 18, while the other end is hooked to a pin 32 mounted in the upper section 19. Such pin also serves to pivotally support the pawl assembly 33, 34.

The upper section 34 of the pawl assembly is formed with a rounded nose adapted to engage the depressions between the ratchet teeth 25, the nose section 34 being pivoted, by a pin 35, to the free end of the lower section 33. The pawl sections are free to break in one direction, as shown in Figure 4, but in the other direction cannot move beyond the straight relation in which they are shown in Figure 3. The stop means limiting their movement in the latter direction is effected by engagement of a portion 36 of the nose section with a web 37 which forms the bight of the U-shaped lower section 33. A pin 38 carried by the holding section 19 of the lever assembly limits the angular movement of the pawl sections. The pawl assembly blocks return movement of the lever assembly, when the pawl sections lie in the straight relation in which they are shown in Figure 3, while when they are broken to the angular relation in which they are shown in Figure 4, they permit such return movement, by reason of the disengagement of the nose portion 34 from the ratchet portion 25.

The pawl assembly is operated by means of a link, 40, pivoted at one end, as by means of a pin 41, to the lower pawl section 33, and at its other end so connected to the hand lever portion 18 as to be driven positively thereby in one direction, and yieldably in the opposite direction. The link is freely slidable in an aperture 42 in lever section 18, a nut 44 providing a positive but adjustable abutment, preventing such relative movement in one direction, while a compression spring 45, encircling the link 40, tends to move the hand lever portion 18 and the pawl assembly apart, with a force which is less than that exerted by the spring 30.

The spring 45 normally maintains the pawl sections in the straight position in which they are shown in Figure 3, and immediately straightens the pawl sections whenever the hand lever 18 is released and allowed to return to its normal abutting engagement with the lever section 19, the force of the spring 30 thus acting to return both the hand section 18 and the pawl assembly to their locking positions, in which they are shown in Figure 3.

When the hand lever portion is moved in a direction opposite to that indicated by the arrow 29, the pawl assembly tends to resist simultaneous movement of the holding section 19 of the lever assembly in the same direction. The hand section 18 therefore swings away from the upper section, as shown in Figure 4, and the link 40 breaks the pawl sections, as shown in that figure, the upper lever section being thus released and allowed to travel with the hand section, the nose of the pawl riding freely over the teeth. When the hand lever is released or slightly pulled back, however, the parts reassume the relation shown in Figure 3, the pawl sections being straightened and again forced into holding engagement with the ratchet. When the lever assembly is pulled in the direction indicated by the arrow 29, the pawl assembly remains straight, and rides over the teeth by reason of the lost motion permitted by the spring 45.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a lever assembly formed in two articulated sections limitedly swingable with relation to each other, one comprising an operating section and the other a holding section, a ratchet appurtenant the holding section, pawl means carried by the holding section and operatively engageable with the ratchet to restrain unwanted movement of the lever assembly, means operable by relative movement between said lever sections for releasing said pawl means, said pawl means comprising two pivoted sections swingable with relation to each other to an extended, braced position in which they blockingly engage the ratchet, and to a folded position in which they allow relative movement between the lever assembly and ratchet, said means for releasing the pawl means comprising means connecting said pawl sections to said operating section of the lever whereby to tend to fold the pawl means when the operating section is moved in one direction with relation to the holding section, and to extend said pawl means when the operating section is moved in the opposite direction with relation to the holding section, and spring means tending to maintain said operating portion and holding portion in position to maintain said pawl means extended.

2. In combination with a lever assembly formed in two articulated sections limitedly swingable with relation to each other, one comprising an operating section and the other a holding section, a ratchet appurtenant the holding section, pawl means carried by the holding section and operatively engageable with the ratchet to restrain unwanted movement of the lever assembly, means operable by relative movement between said lever sections for releasing said pawl means, said pawl means comprising two pivoted sections swingable with relation to each other to an extended, braced position in which they blockingly engage the ratchet, and to a folded position in which they allow relative movement between the lever assembly and ratchet, said means for releasing the pawl means comprising means connecting said pawl sections to said lever whereby to tend to fold the pawl means when the operating section is moved in one direction with relation to the holding section, and to extend said pawl means when the operating section is moved in the opposite direction with relation to the holding section, spring means tending to maintain said operating portion and holding portion in position to maintain said pawl means extended, and additional spring means allowing limited lost motion between said operating section and pawl means to allow the pawl means to ride over the ratchet while in said braced position, when the lever assembly is moved in the direction which tends to maintain said pawl means in braced position.

3. In combination with a lever assembly formed in two articulated sections and including a holding section having a pivotal support which carries the entire assembly, and an operating section connected to said holding section and having lost motion connection therewith, a ratchet, pawl means carried by the holding section and normally blocking movement of the holding section in one direction while permitting movement thereof in the opposite direction, spring means normally taking up said lost motion and drawing said sections together to allow movement thereof in the direction permitted by said pawl means without lost motion, operating means connecting said pawl means to the operating section whereby said pawl means is movable away from blocking position when said operating section is moved in the opposite direction with relation to the holding section, said pawl means comprises a pair of foldable links, swingable to and from an extended bracing position in engagement with the ratchet and having a medial pivot movable during folding thereof in substantially the same direction as said operating section is moved to stress said spring means, said operating means comprising a link adapted to move said pivot portion when said operating section is moved with relation to the holding section.

ALVIN L. JOHNSON.